(12) United States Patent
Sarawate et al.

(10) Patent No.: US 10,047,622 B2
(45) Date of Patent: Aug. 14, 2018

(54) FLEXIBLE LAYERED SEAL FOR TURBOMACHINERY

(71) Applicant: General Electric Company, Schenectady, NY (US)

(72) Inventors: Neelesh Nandkumar Sarawate, Niskayuna, NY (US); Victor John Morgan, Simpsonville, SC (US); David Wayne Weber, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 980 days.

(21) Appl. No.: 14/337,453

(22) Filed: Jul. 22, 2014

(65) Prior Publication Data

US 2016/0024951 A1 Jan. 28, 2016

(51) Int. Cl.
*F01D 11/00* (2006.01)
*F16J 15/02* (2006.01)
*F16J 15/08* (2006.01)

(52) U.S. Cl.
CPC ............. *F01D 11/005* (2013.01); *F16J 15/02* (2013.01); *F16J 15/0812* (2013.01); *F05D 2240/59* (2013.01)

(58) Field of Classification Search
CPC ...... F01D 11/005; F16J 15/0812; F16J 15/02; F05D 2240/59
See application file for complete search history.

(56) References Cited

U.S. PATENT DOCUMENTS

| 4,607,851 A | 8/1986 | Usher |
| 4,871,181 A | 10/1989 | Usher et al. |
| 5,104,286 A | 4/1992 | Donlan |
| 5,509,669 A * | 4/1996 | Wolfe .................. F01D 11/005 277/654 |
| 6,502,825 B2 * | 1/2003 | Aksit .................. F16J 15/3288 277/355 |
| 6,733,234 B2 | 5/2004 | Paprotna et al. |

(Continued)

FOREIGN PATENT DOCUMENTS

| DE | 102011055692 A1 | 5/2012 |
| EP | 2586994 A2 | 5/2013 |

OTHER PUBLICATIONS

European Search Report and Opinion issued in Connection with Corresponding EP Application No. 15177432.0 dated Nov. 27, 2015.

*Primary Examiner* — Eldon Brockman
(74) *Attorney, Agent, or Firm* — GE Global Patent Operation; John Darling

(57) ABSTRACT

The present application provides seal assemblies having improved flexibility for reducing leakages between adjacent misaligned components of turbomachinery. The seal assemblies include a first outer shim formed of a flexible permeable material and a second outer shim formed of a substantially impervious material. At least the second outer shim is configured for sealing engagement with seal slots of the adjacent components. The seal assemblies may also include at least one of an inner shim and a filler layer positioned between the first and second outer shims. The seal assemblies may be sufficiently flexible to account for misalignment between the adjacent components, sufficiently stiff to meet assembly requirements, and sufficiently robust to meet operating requirements associated with turbomachinery. A turbomachine including the seal assembly is provided.

17 Claims, 3 Drawing Sheets

(56) References Cited

U.S. PATENT DOCUMENTS

| | | |
|---|---|---|
| 8,028,996 B2 | 10/2011 | Ruggiero et al. |
| 8,678,754 B2 | 3/2014 | Morgan et al. |
| 9,188,228 B2* | 11/2015 | Sarawate ............... F16J 15/128 |
| 2002/0121744 A1* | 9/2002 | Aksit ...................... F01D 9/023 |
| | | 277/411 |
| 2003/0039542 A1* | 2/2003 | Cromer ................. F01D 11/005 |
| | | 415/135 |
| 2005/0202233 A1 | 9/2005 | Dove |
| 2009/0085305 A1 | 4/2009 | Demiroglu et al. |
| 2012/0043727 A1 | 2/2012 | Alfes et al. |
| 2012/0133102 A1 | 5/2012 | Samudrala et al. |
| 2012/0183393 A1* | 7/2012 | Demiroglu ............. F01D 9/023 |
| | | 415/196 |
| 2012/0211943 A1 | 8/2012 | Hefner et al. |
| 2013/0106066 A1* | 5/2013 | Sarawate ............... F16J 15/128 |
| | | 277/641 |
| 2013/0108420 A1 | 5/2013 | Morgan et al. |
| 2013/0134678 A1 | 5/2013 | Sarawate et al. |
| 2014/0091531 A1* | 4/2014 | Morgan ................ F01D 11/005 |
| | | 277/597 |

* cited by examiner

FLEXIBLE LAYERED SEAL FOR TURBOMACHINERY

BACKGROUND

The present application relates generally to seals having improved flexibility for reducing leakage, and more particularly to shim seals for reducing leakage between adjacent stationary components of turbomachinery.

Leakage of hot combustion gases and/or cooling flows between turbomachinery components generally causes reduced power output and lower efficiency. For example, the hot combustion gases may be contained within a turbine by providing pressurized compressor air around the hot gas path. Typically, leakage of the high pressure cooling flows between adjacent stator components (such as shrouds, nozzles, and diaphragms) into the hot gas path may lead to detrimental parasitic losses. Such parasitic losses may reduce efficiency and require an increase in burn temperature, and thereby an increase in $NO_x$ (CO produced at low temperature, only occurs at part load) and a decrease in engine gas turbine efficiency to maintain a desired power level as compared to an environment void of such stator-stator leakage. Turbine efficiency thus can be improved by reducing or eliminating stator-stator leakage locations.

Preventing leakage between stator-stator component junctions with seals is complicated by the fact that adjacent stator components have surfaces of different shapes and may expand differently under high temperature conditions causing misalignment between the components. Further, the seals must pass manufacturing, assembly and installation limitations, meet robustness constraints associated with turbomachinery, and withstand the relatively high forces and temperatures produced in turbomachinery.

Currently, turbomachinery typically employ woven metallic cloth based seals, including impervious outer shims, positioned between adjacent stator components to limit the leakage of cooling flows therebetween. Such cloth seals often have a porous woven wire mesh cloth layer wrapped around a metal shim with a curved "shepherds hook" on either side. Manufacturing variations, however, involved in creating the "shepherds hook" and in assembling the cloth/metal seals may result in seals that do not adequately reduce or substantially eliminate the leakage rate between adjacent turbomachinery components, such as a stator-stator junctions. Similarly, some cloth seals may tend to become crimped or otherwise plastically deformed within the space or gap between components during installation or assembly, and thereby perform less effectively than desired.

Accordingly, it would be desirable to reduce or substantially eliminate leakage between turbomachinery components, such as between adjacent stator components, and more particularly between misaligned turbomachinery components by utilizing flexible seals. Therefore it is desirable to provide for an improved seal assembly for use between stator components and other components in a heavy duty gas turbine engine, that are sufficiently flexible so as to provide adequate sealing during use and in the presence of any misalignment between the components. It is further desirable that such seals be substantially temperature resistant and wear resistant (i.e., long component life) and meet the manufacturing, assembly, installation and robustness requirements associated with turbomachinery.

BRIEF DESCRIPTION

In accordance with one aspect of the present disclosure, a seal assembly for sealing a gap between adjacent turbomachinery components is disclosed. The seal assembly including a first outer shim comprised of a substantially permeable material; and a second outer shim, operably coupled to the first outer shim. The second outer shim comprised of a substantially impervious material. The first outer shim is configured in a top position and the second outer shim is configured in a bottom position adjacent a low-pressure surface of the seal assembly. The first outer shim and the second outer shim are configured to span across the gap and engage each of the adjacent turbomachinery components to substantially seal the gap therebetween.

In accordance with another aspect of the present disclosure, another seal assembly for sealing a gap between adjacent turbomachinery components is disclosed. The seal assembly including a first outer shim, a second outer shim and at least one of an inner shim and a filler layer positioned between the first and second outer shims. The first outer shim is comprised of a flexible material permeable to at least one of gases, liquids and solids at a pressure produced in the turbomachinery components. The second outer shim is comprised of a material substantially impervious to at least one of gases, liquids and solids at a pressure produced in the turbomachinery components. The first outer shim, second outer shim and at least one of an inner shim and a filler layer are operably coupled to one another. The first outer shim is configured in a top position and the second outer shim is configured in a bottom position adjacent a low-pressure surface of the seal assembly. At least the second outer shim is configured to span across the gap and engage each of the adjacent turbomachinery components to substantially seal the gap therebetween.

In accordance with another aspect of the present disclosure, a turbomachine is disclosed. The turbomachine including a seal assembly for sealing a gap between adjacent turbomachinery components. The turbomachine including a first stator, a second stator and a seal assembly positioned between the first stator and the second stator. The seal assembly comprising a first outer shim and a second outer shim. The first outer shim is comprised of a flexible material permeable to a flow of fluid at a pressure produced in the first stator and the second stator. The second outer shim is operably coupled to the first outer shim and comprised of a material substantially impervious to the flow of fluid at a pressure produced in the first stator and the second stator. The first outer shim is configured in a top position and the second outer shim is configured in a bottom position adjacent a low-pressure surface of the seal assembly. The first outer shim and the second outer shim are configured to span across a gap between the first stator and the second stator and engage each of the first stator and the second stator to substantially seal the gap therebetween.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments. Components, aspects, features, configurations, arrangements, uses and the like described, illustrated or otherwise disclosed herein with respect to any particular seal embodiment may similarly be applied to any other seal embodiment disclosed herein.

Figure 1:
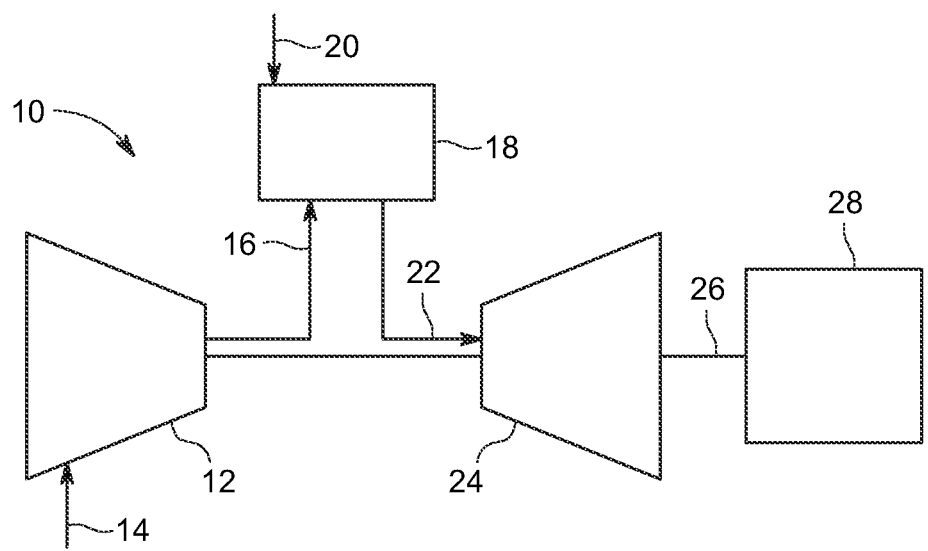
FIG. 1 is a schematic view of a turbomachine, and more particularly a gas turbine engine, showing a compressor, a combustor and a turbine, according to one or more embodiments disclosed herein.

Referring now to the drawings, in which like numerals refer to like elements throughout the several views, FIG. 1 shows a schematic view of a turbomachine and more particularly a gas turbine engine 10 as may be used herein. The gas turbine engine 10 may include a compressor 12. The compressor 12 compresses an incoming flow of air 14. The compressor 12 delivers a compressed flow of air 16 to a combustor 18. The combustor 18 mixes the compressed flow of air 16 with a pressurized flow of fuel 20 and ignites the mixture to create a flow of combustion gases 22. Although only a single combustor 18 is shown, the gas turbine engine 10 may include any number of combustors 8. The flow of combustion gases 22 is in turn delivered to a turbine 24. The flow of combustion gases 22 drives the turbine 24 so as to produce mechanical work. The mechanical work produced in the turbine 24 drives the compressor 12 via a shaft 26 and an external load 28 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y. including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
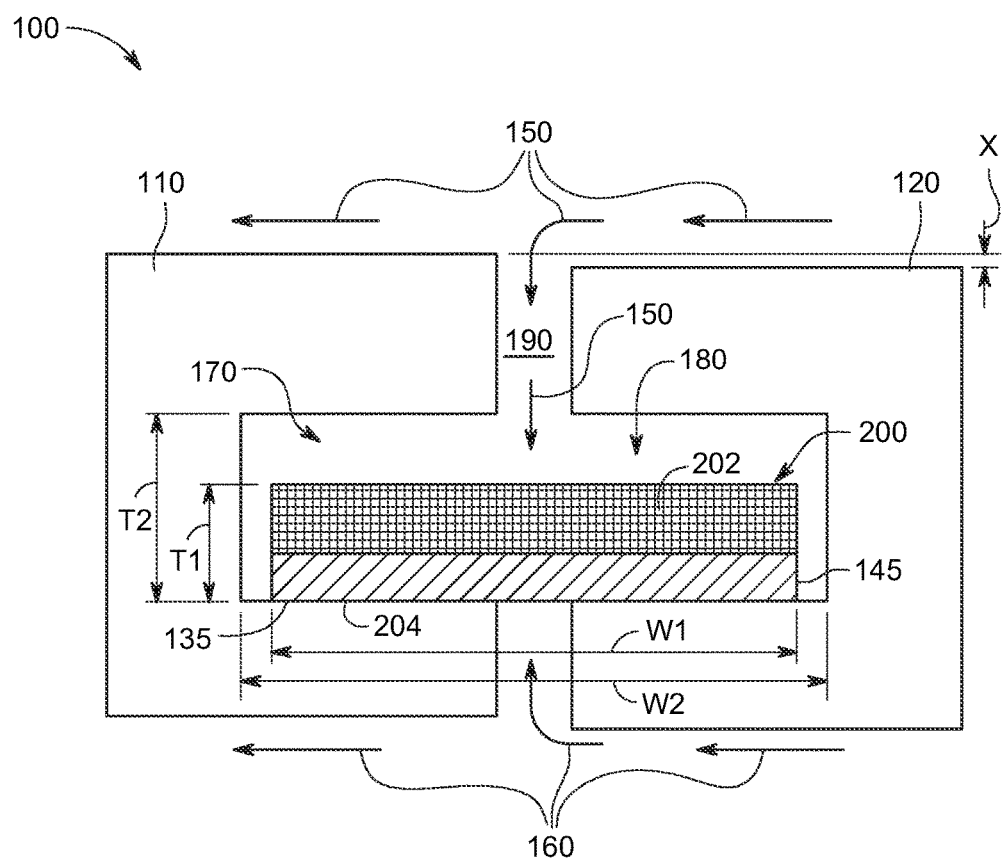
FIG. 2 is a side cross-sectional view of a portion of an exemplary turbomachine, such as the gas turbine engine of FIG. 1 illustrating a first exemplary seal assembly in use sealing a pathway between exemplary adjacent components, according to one or more embodiments disclosed herein.

Referring now to FIG. 2, illustrated is a cross-section of a portion of an exemplary turbomachine 100, such as gas turbine engine 10 of FIG. 1, including an exemplary first turbine component 110, an adjacent exemplary second turbine component 120 and an exemplary seal 200 installed in the first and second turbine components 110, 120. In the exemplary embodiment shown in FIG. 2, the first and second turbine components 110, 120 may be a first nozzle of a first stator and a second nozzle of a second stator, respectively. In other embodiments, the first and second turbine components 110, 120 may be any other adjacent turbomachinery components. Stated differently, the exemplary seals described herein may be configured for, or used with, any number or type of turbomachinery components requiring a seal to reduce leakage and substantially prevent gases, liquids and/or solids from migrating between the components.

The cross-section of the exemplary adjacent turbine components 110, 120 and exemplary seal 200 illustrated in FIG. 2 is taken along a width of the structures, thereby illustrating an exemplary width and thickness/height of the structures. It is noted that the relative width, thickness and cross-sectional shape of the structures illustrated in FIG. 2 is exemplary, and the structures may include any other relative width, thickness and cross-sectional shape. Further, the length of the structures (extending in-out of the page of FIG. 2) may be any length, and the shape and configuration of the structures in the length direction may be any shape or configuration.

As shown in FIG. 2, the first and second turbine components 110, 120 may be spaced from one another such that a gap or pathway 190 extends between the first and second components 110, 120. Such a gap or pathway 190 may thereby allow a flow of fluid, such as airflow, between the first and second turbine components 110, 120. In some configurations, the first and second turbine components 110, 120 may be positioned between a first airflow 150, such as a high pressure cooling airflow, and a second airflow 160, such as a lower pressure, hot combustion airflow. It is noted that the term "airflow" is used herein to describe the movement of any material or composition, or combination of materials or compositions, translating through the gap or pathway 190 between the first and second turbine components 110, 120.

To accept a seal that spans across the gap or pathway 190, and thereby block or otherwise cutoff or seal the gap or pathway 190, the first and second turbine components 110, 120 may each include a seal slot, as shown in FIG. 2. In the exemplary illustrated embodiment, the first turbine component 110 includes a first seal slot 170 and the second turbine component 120 includes a second seal slot 180. The first and second seal slots 170, 180 may have any size, shape, or configuration capable of accepting a seal therein. For example, as shown in the illustrated exemplary embodiment in FIG. 2, the first and second seal slots 170, 180 may be substantially similar to one another and positioned in a mirrored relationship to define together a net slot or cavity that extends from within the first turbine component 110, across the gap or pathway 190, and into the second turbine component 120. In this manner, the pair of first and second seal slots 170, 180 may jointly form a cavity to support opposing portions of a seal such that the seal 200 passes through the gap or pathway 190 extending between the first and second turbine components 110, 120.

In some arrangements wherein the first and second turbine components 110, 120 are adjacent, the first and second seal slots 170, 180 may be configured such that they are adjacent and substantially aligned (e.g., in a mirrored or symmetric relationship). However, due to manufacturing and assembly limitations and/or variations, as well as thermal expansion, movement and the like during use, the first and second seal slots 170, 180 may be skewed, twisted, angled or otherwise misaligned. In other scenarios, the first and second seal slots 170, 180 may remain in a mirrored or symmetric relationship, but the relative positioning of the first and second seal slots 170, 180 may change (such as from use, wear or operating conditions). The term "misaligned" is used herein to encompass any scenario wherein seal slots have changed relative positions or orientations as compared to a nominal or initial position or configuration.

With respect to the exemplary first and second seal slots 170, 180 of the exemplary first and second turbine components 110, 120 and the exemplary seal 200 of FIG. 2, in a misaligned configuration, illustrated by an exemplary misalignment "X" of components 110, 120, the exemplary seal 200 must be flexible to account for the misalignment and maintain sealing contact with the first and second seal slots 170, 180 to effectively cut off or eliminate the gap or pathway 190 extending between the first and second turbine components 110, 120 to thereby reduce or prevent the first and second airflows 150, 160 from interacting. More particularly, as shown in FIG. 2 the first and second airflows 150, 160 may interact with the gap or pathway 190 such that the first airflow 150 is a "driving" airflow such that the exemplary seal 200 is forced against first side surfaces 135, 145 of the first and second seal slots 170, 180, respectively. In such scenarios, the seal 200 may be preferably sufficiently flexible to elastically deform as a result of the forces applied by the first airflow 150 (e.g., above that applied by the second airflow 160) to account for any misalignment between the first and second seal slots 170, 180, but sufficiently stiff to resist being "folded" or otherwise "pushed" into the gap or pathway 190. Stated differently, in such a scenario, the exemplary seal 200 may be preferably sufficiently flexible, but yet sufficiently stiff, to maintain sealing engagement with the first side surfaces 135, 145 via the forces of the first airflow 150.

In addition to being sufficiently flexible/stiff (in all directions) to effectively seal the gap or pathway 190 in misalignment scenarios, as described above, the exemplary seal 200 may preferably be sufficiently stiff to satisfy assembly requirements. For example, in one exemplary assembly method the exemplary seal 200 may be initially inserted in the first seal slot 170 of the first turbine component 110, and then the second turbine component 120 moved into an adjacent position with the first turbine component 110 such that the exemplary seal 200 extends into the second seal slot 180 thereof. During such an exemplary assembly method, the exemplary seal 200 may experience "crush forces." Such crush forces may result from the free end of exemplary seal 200 not being aligned with the second seal slot 180 of the second turbine component 120 when the second turbine component 120 is moved into position. In such a situation, an interior face of the second turbine component 120 may contact the free end of the exemplary seal 200 and act to "crush" the exemplary seal 200. To accommodate for such an exemplary assembly error, the exemplary seal 200 may be sufficiently stiff to resist such "crush forces" up to a predefined extent, over which the exemplary seal 200 will "give way" (i.e., become "crushed"). The extend or limit of the ability of the exemplary seal 200 to resist such "crush forces" (the predefined extent") may be chosen or designed such that an assembly operator would be alerted or able to detect when the exemplary seal 200 has been compromised (i.e., "crushed").

As also illustrated in FIG. 2, the thickness T1 of the exemplary seal 200 may be less than the thickness T2 of the first and second seal slots 170, 180, and thereby the thickness T2 of the net slot created by the first and second seal slots 170, 180 when the first and second turbine components 110, 120 are assembled. In some embodiments, the thickness T1 of the exemplary seal 200 may preferably be within the range of about 25 mm to about 150 mm, and more preferably within the range of about 49 mm to about 130 mm, and even more preferably within the range of about 59 mm to about 120 mm In alternative embodiments (not shown), the thickness T1 of the exemplary seal 200 before installation may be greater than the thickness T2 of the first and second turbine components 110, 120. In such alternative embodiments (not shown), the exemplary seal 200 may be compressed to fit within the first and second seal slots 170, 180, and thereby may include portions or components configured for such compression. For example, U.S. Pat. No. 6,733,234, U.S. Patent Publication No. 2009/0085305 and U.S. patent application Ser. No. 13/306,090 are directed seals with such "compression fit" features, and are herein incorporated by reference in their entirety.

As shown in FIG. 2, the exemplary seal 200 may be an assembly including a first outer shim or plate 202 positioned on an outer portion of the seal 200 and a second outer shim or plate 204 positioned on an inner portion of the seal 200, wherein the first outer shim 202 and the second outer shim 204 are coupled to one another. The exemplary first and second outer shims 202, 204 in combination are effective in substantially preventing the passage of substances therethrough, while maintaining flexibility of the seal to allow for misaligned components 110, 120. More specifically, the first outer shim 202 is formed permeable in nature to at least one of gases, liquids and solids at pressures produced in turbomachinery. To achieve such performance, the first outer shim 202 is formed of flexible permeable material, such as a wire mesh woven structure, a ribbon mesh woven structure or combinations thereof. The second outer shim 204 is formed of a substantially impervious material such as a solid material. In this way, the exemplary first or second outer shims 202, 204 may sealingly engage sealing surfaces of the first and second seal slots 170, 180 of the first and second components 110, 120 to substantially prevent gases, liquids and/or solids from migrating through the gap 190 between the first and second components 110, 120 and provide an inherently more flexible seal than a seal including both first and second outer shims formed of a solid material. The reduced stiffness, and thus increased flexibility of the seal assembly 200, would lead to lower leakage in higher misaligned conditions because the seal would be able to conform better to the geometry of the exemplary first and second turbine components 110, 120, and first and second seal slots 170, 180.

In the illustrated embodiment in FIG. 2, for example, the first airflow 150 may force the exemplary second outer shim 204 against the first side surfaces 135, 145 of the first and second seal slots 170, 180 and, due to the permeable nature of the first outer shim 202 and the impervious nature of the second outer shim 204. The impervious nature of the second outer shim 204 further prevents the airflow from migrating through the gap 190 and into the lower pressure second, airflow 160. As previously indicated, the first outer shim 202 is made from any material or combination of materials that is substantially permeable to liquids, gases and/or solids at pressures experienced in turbomachinery such that the first outer shim 202 provides reduced stiffness and increased flexibility of the first outer shim 202. The second outer shim 204 is made from any material or combination of materials that is substantially impervious to liquids, gases and/or solids at pressures experienced in turbomachinery such that the second outer shim 204 provides low leakage rates therethrough. For example, the second outer shim 204 may include leakage rates comparable to solid bar shim seals typically used in turbomachinery. As previously indicated, in an embodiment, the first outer shim 202 is formed of a wire mesh woven structure, a ribbon mesh woven structure or combinations thereof and the second outer shim 204 may be solid metal stock.

In the illustrated embodiment in FIG. 2, the exemplary first outer shim 202 may be said to have a top position and the exemplary second outer shim 204 a bottom position. The terms "top", "bottom" and "middle," or "interior" are used herein to reflect absolute positions relative to flow of fluid therethrough, and more specifically the pressure of the fluid therethrough. In the illustrated exemplary embodiment shown in FIG. 2 the seal assembly 100 is installed with the second outer shim 204 adjacent the "sealing" or "low-pressure" surface of the first and second seal slots 170, 180 of the first and second components 110, 120 (i.e., the first side surfaces 135, 145 of exemplary first and second components 110, 120, respectively). In an alternative embodiment however, the second outer shim 204 may not be provided adjacent the sealing surface, or the first side surface 135, so as to be at middle or intermediate positions (as explained further below), but remains at a bottom position relative to the first outer shim 202.

In some embodiments, the first and second outer shims 202, 204 may preferably be resistant, or otherwise tolerate, to high temperatures—such as temperatures typically produced within turbomachinery. For example, in some embodiments the first and second exemplary shims 202, 204 may include stainless steel or a nickel based alloy (at least in part), such as nickel molybdenum chromium alloy.

The size of the exemplary first and second outer shims 202, 204 may be any size. As described above with respect to the exemplary seal assembly 200 itself, the width W1 of the first and second outer shims 202, 204 may be less than the width W2 of the net slot created by the first and second slots 170, 180 of the first and second components 110, 120, respectively, and the gap 190 between the components 110, 120 when the components 110, 120 are installed adjacent to one another. Similarly, the thickness of T1 and length of the first and second exemplary shims 202, 204 may vary. In some embodiments, at least one of the width W1, thickness T1 and length of the first and second outer shims 202, 204 is dependent upon, or at least related to, the components 110, 120 in which the exemplary seal 200 is installed and any other components of the exemplary seal 200. In some embodiments that include both the first and second exemplary shims 202, 204, at least one of the widths W1, thicknesses T1 and lengths of the first and second outer shims 202, 204 differ from each other.

The shape and configuration of the exemplary first and second outer shims 202, 204 may also vary. In the exemplary illustrated embodiment, the first and second outer shims 202, 204 are planar with substantially smooth outer surfaces. In some embodiments, at least the shape and configuration of the exterior sealing surface of the second outer shim 204 (e.g., the surface that interacts with the exemplary first side surfaces 135, 145 or other sealing surfaces of the exemplary first and second seal slots 170, 180) may be related to the shape and configuration of the slots 110, 120 in which the first and second outer shims 202, 204 are installed. For example, in the illustrated example in FIG. 2 the exterior bottom surface of the exemplary second outer shim 204 may be planar to substantially abut or otherwise substantially contact the substantially planar first side surfaces 135, 145 of the first and second seal slots 170, 180 to effectively prevent or reduce leakage of the first airflow 150 between the seal assembly 200 and the first side surfaces 135, 145 of the first and second seal slots 170, 180 and, thereby, into the second airflow 160. Stated differently, the shape and configuration of the exemplary first and second outer shims 202, 204, such as the contour of an outer sealing surface thereof, may be configured to ensure sealing engagement with the first and second seal slots 170, 180. In some alternative embodiments (not shown), the shape and configuration of the second outer shim 204, such as the contour outer sealing surface thereof, may be shaped or configured differently that the corresponding sealing surfaces of the first and second seal slots 170, 180 (such as the exemplary first side surfaces 135, 145 of the first and second seal slots 170, 180 illustrated in FIG. 2).

As described above, the exemplary seal 200 includes increased flexibility, in light of the inclusion of the permeable first outer shim 202, to account for any misalignment expected between stationary first and second turbomachinery components 110, 120 (and therefore the first and second seal slots 170, 180 and any sealing surfaces formed thereby). In addition, the exemplary seal 200 is sufficiently stiff to prevent it from being pushed or deformed into the gap 190, sufficiently stiff to meet assembly requirements, and sufficiently robust to meet turbomachinery requirements. As a result, exemplary seal embodiments including the first and second exemplary shims 202, 204, such as exemplary seal 200 illustrated in FIG. 2 may be configured such that the seal assembly 200, as a whole, provides the flexibility, stiffness and robustness described above for use in turbomachinery to account for misalignment and maintain low leakage rates between adjacent components.

As will be described below, the manner in which the first and second outer shims 202, 204 are coupled to one another may also affect the performance of the seal assembly 200. For example, the manner in which the first and second outer shims 202, 204 are coupled to one another may additionally effect at least the flexibility of the seal assembly 200 (e.g., with respect to its ability to further account for misalignment between the first and second components 110, 120) and the stiffness of the seal assembly 200 (e.g., with respect to its ability to meet for assembly requirements). Similarly, the shape or configuration of the first and second outer shims 202, 204 may be effected by the attachment mechanism. For example, the attachment mechanism may affect the exterior surface contour or shape of the first and second outer shims 202, 204. As such, in some exemplary embodiments the seal assembly 200 includes the first and second outer shims 202, 204 coupled to one another such that the flexibility, stiffness, shape and configuration of the seal assembly 200 are such that the seal assembly 200 maintains low leakage rates and meets installation requirements for turbomachinery components, such as the first and second components 110, 120 shown in FIG. 2. The attachment mechanism may also preferably withstand the robustness limitations associated with turbomachinery (e.g., high temperatures and pressures). In some embodiments, the first and second exemplary shims 202, 204 may be coupled to each other via high temperature adhesives, high strength fasteners, welds, brazes, and other types of known fastening means. It should be understood that although the illustrated seal assembly 200 is depicted as not including a means for coupling the first outer shim 202 and the second outer shim 204 to one another, a coupling means as described presently may be included.

Figure 3:
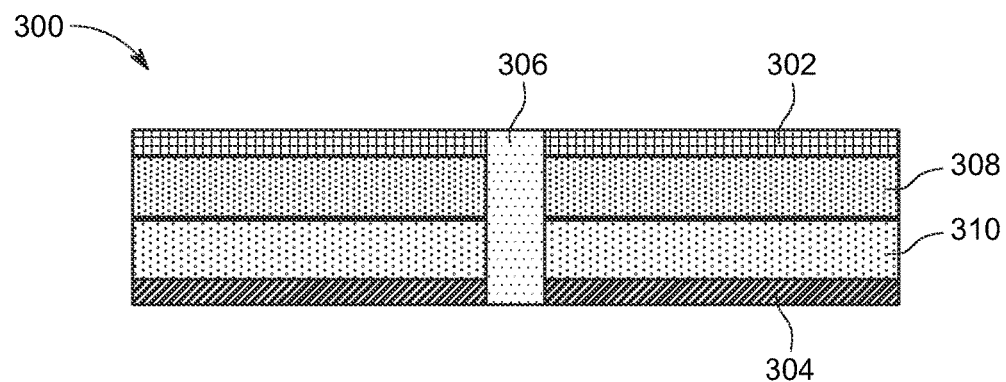
FIG. 3 is a side cross-sectional view of a second exemplary seal assembly, according to one or more embodiments disclosed herein.

FIG. 3 shows an exemplary alternative embodiment of a seal assembly generally indicated by reference numeral 300. Exemplary seal assembly 300 is similar to the exemplary seal assembly 200 described above and illustrated in FIG. 2, and therefore like reference numerals preceded by the numeral "3" as opposed to "2" are used to indicate like elements. The description above with respect to exemplary seal assembly 200 equally applies to exemplary seal assembly 300 (and the alternative embodiments of exemplary seal 300 described herein), including the description regarding alternative embodiments or other modifications to exemplary seal assembly 200. For example, the exemplary seal assembly 300 (and the alternative embodiments of exemplary seal 300 described herein) may be configured to meet the flexibility, stiffness, and robustness requirements or capabilities that lead to low leakage rates in turbomachinery as described above with respect to exemplary seal 200.

Like exemplary seal assembly 200, exemplary seal assembly 300 may include first and second outer shims 302, 304 in top and bottom positions, respectively, for sealing engagement with seal slots in adjacent components (not shown). In addition, as in exemplary seal assembly 200, the first outer shim 302 is formed permeable in nature to at least one of gases, liquids and solids at pressures produced in turbomachinery. More specifically, the first outer shim 302 is formed of flexible permeable material, such as a wire mesh woven structure, a ribbon mesh woven structure or combinations thereof. The second outer shim 304 is formed of a substantially impervious material such as a solid material.

In contrast to exemplary seal assembly 200, exemplary seal assembly 300 includes an exemplary medial weld 306 as a mechanism for coupling the first and second outer shims 302, 304 to one another and intermediate layers disposed between the first and second outer shells 302, 304.

In the exemplary seal assembly 300 shown in FIG. 3, the first and second outer shims 302, 304 are coupled to one another by the exemplary weld 306 in a medial or central portion of the width of the first and second outer shims 302, 304. The medial weld 306 may be effective in coupling the first and second outer shims 302, 304 while maintaining a minimum desired level of flexibility and stiffness of the seal assembly 300. In some such embodiments, the medial weld 306 extends for relatively a short distance along the length of the seal assembly 300 (e.g., a defined spot or point), and a series of such medial welds 306 is provided along the length of the seam assembly 300. In some other such embodiments, the medial weld(s) 306 extends for a relatively long distance along the length of the seal assembly 300 (e.g., a rolling seam weld). In some such seal assembly 300 embodiments, one or more "long" medial weld 306 may be provided. In some alternative embodiments (not shown), the first and second outer shims 302, 304 may be coupled to one another by multiple, distinct welds that are spaced or staggered at least one of along the width of the seal assembly 300 and the length of the seal assembly 300 (such as with multiple welds that extend for a short distance along the length of the seal assembly 300). For example, the exemplary first and second outer shims 302, 304 may be coupled to one another by welds that extend for a short distance along the length of the seal assembly 300, and that are staggered along the width and length of the seal assembly 300. In some such embodiments, fewer medial welds may be provided than welds located adjacent the outer sides of the seal assembly 300. In some seal assembly embodiments including the first and second outer shims 302, 304 welded to one another (such as those discussed above), the welds may be spot welds, laser welds, frictions welds, seam welds or combinations thereof. In some alternative embodiments, the first and second outer shims 302, 304 may be brazed to one another.

In this particular embodiment, the seal assembly 300 includes a pair of intermediate flexible cloth layers disposed between the first and second outer shims 302, 304. More specifically, included within seal assembly 300 are a first cloth layer 308 and a second cloth layer 310. It is anticipated that any number of cloth layers may be included in the seal assembly 300. The flexible cloth layers 308, 310 may be made out of a woven wire mesh or any flexible high temperature material. For example, metal foam, a hollow box-type shim, or even additional welded shim layers and the like may be used. The flexible cloth layers 308, 310 have a middle (intermediate) position, relative to the "top", "bottom", "middle" as previously described. The first and second outer shims 302, 304 and the flexible cloth layers 308, 310 may be coupled via high temperature adhesives, high strength fasteners, welding and other types of conventional fastening means. The seal assembly 300 and the components thereof may have any desired size, shape or configuration. The flexible cloth layers 308, 310 provide thickness to the seal assembly 300 without substantially increasing overall stiffness. The flexible cloth layers 308, 310 also mitigate potential assembly or maintenance concerns. Additional non-metallic filler materials also may be used so as to add thickness therein without impacting an overall flexibility.

Figure 4:
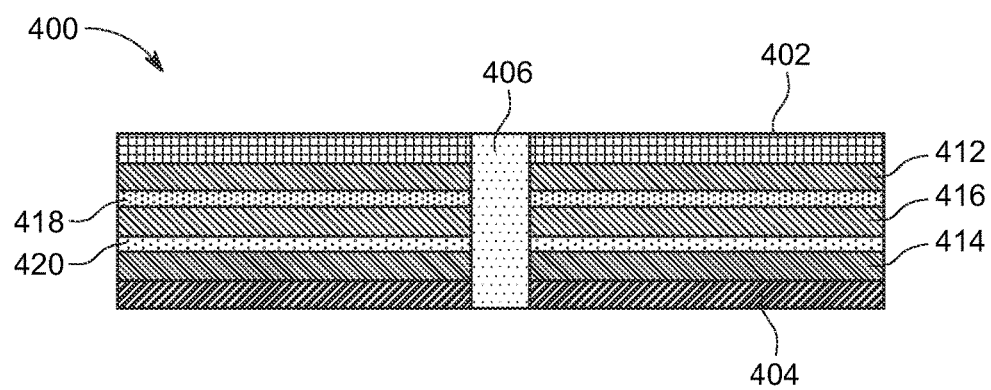
FIG. 4 is a side cross-sectional view of a third exemplary seal assembly, according to one or more embodiments disclosed herein.

FIG. 4 shows an exemplary alternative embodiment of a seal assembly generally indicated by reference numeral 400. Exemplary seal assembly 400 is similar to the exemplary seal assemblies 200, 300 described above and illustrated in FIGS. 2-3, respectively, and therefore like reference numerals preceded by the numeral "4" as opposed to a "2" or "3" are used to indicate like elements. The description above with respect to exemplary seal assemblies 200, 300 equally applies to exemplary seal assembly 400 (and the alternative embodiments of exemplary seal assembly 400 described herein), including description regarding alternative embodiments or other modifications to exemplary seal assemblies 200, 300. For example, the exemplary seal assembly 400 (and the alternative embodiments of exemplary seal 400 described herein) may be configured to meet the flexibility, stiffness, and robustness requirements or capabilities that lead to low leakage rates in turbomachinery as described above with respect to exemplary seal assemblies 200, 300.

Like exemplary seal assemblies 200, 300, exemplary seal assembly 400 may include first and second outer shims 402, 404 in top and bottom positions, respectively, for sealing engagement with seal slots in adjacent components (not shown). Similar to the previous embodiments, the first outer shim 402 is made from any material or combination of materials that is substantially permeable to liquids, gases and/or solids at pressures experienced in turbomachinery such that the first outer shim 402 provides reduced stiffness and increased flexibility of the first outer shim 402. The second outer shim 404 is made from any material or combination of materials that is substantially impervious to liquids, gases and/or solids at pressures experienced in turbomachinery such that the second outer shim 404 provides low leakage rates therethrough. Similar to exemplary seal assembly 300, exemplary seal assembly 400 includes an exemplary medial weld 406 as a mechanism for coupling the first and second outer shims 402, 404 to one another.

In the exemplary seal assembly 400 shown in FIG. 4, the first and second outer shims 402, 404 are coupled to one another by the exemplary weld 406 in a medial or central portion of the width of the first and second outer shims 402, 404.

As discussed above with respect to an alternative embodiments of exemplary seal assemblies 200, 300, exemplary seal 400 includes additional layers of components intermediate of the first and second outer shim 402, 404. As shown in FIG. 4, seal assembly 400 includes exemplary third and fourth shims 412, 414 adjacent the exemplary first and second outer shims 402, 404, respectively, exemplary first and second filler layers 418 and 420 adjacent and interior to the third and fourth shims 412, 414, respectively, and an exemplary fifth shim 416 positioned between the first and second filler layers 418, 412. In the illustrated exemplary embodiment of seal assembly 400, the exemplary first outer shim 402, exemplary second outer shim 404, exemplary third shim 412, exemplary fourth shim 414, exemplary first filler layer 418, exemplary second filler layer 420 and exemplary fifth shim 416 are coupled to one another via at least one medially positioned weld 406 that penetrates through all of the components or layers. As described presently, the components or layers of exemplary seal assembly 400 may be coupled to one another by at least one combination or group of attachment mechanisms.

The exemplary third, fourth and fifth shims 412, 414, 416 may or may not be the same or substantially similar shape, size and configuration as either the exemplary first or second outer shims 402, 404. For example, the exemplary third and fourth shims 412, 414 may be the same as either the exemplary first or second outer shims 402, 404, but the exemplary fifth shim 416 may be different in some respect than the first and second outer shims 402, 404. As another example, at least one of the exemplary third, fourth and fifth shims 412, 414, 416 may be substantially the same size as either the first or second outer shims 402, 404 but for thickness and/or the material properties. In some embodiments including the exemplary third and fourth shims 412, 414, the third and fourth shims 412, 414 may be substantially solid and positioned adjacent the first and second outer shims 402, 404, respectively. In some embodiments including the exemplary third and fourth shims 412, 414, the third and fourth shims 412, 414 may be substantially permeable and positioned adjacent the first and second outer shims 402, 404, respectively. In some embodiments including the exemplary third and fourth shims 412, 414 the third and fourth shims 412, 414 may be either substantially solid or permeable and positioned adjacent the first and second outer shims 402, 404, respectively. Similarly, in some embodiments including the exemplary fifth shim 416, the fifth shim 416 may be substantially solid and positioned adjacent the exemplary first and second outer shims 402, 404, respectively. In some embodiments including the exemplary fifth shim 416, the fifth shim 416 may be substantially permeable and positioned adjacent the exemplary first and second outer shims 402, 404, respectively. In the illustrated embodiment shown in FIG. 4, the exemplary third, fourth and fifth shims 412, 414, 416 are sheet metal shims.

In some embodiments, the exemplary third, fourth and fifth shims 412, 414, 416 may be effective in providing material to any additional permeable layers (in addition to the permeable first outer layer 402) included within the seal assembly 400 during welding. For example, if at least one additional permeable layer is provided in the seal assembly 400, such as either of the first and second filler layers 418, 420, material from the third, fourth and fifth shims 412, 414, 416 may partially flow into an adjacent permeable layer when heated during a welding process, for example. In this way, the third, fourth and fifth shims 412, 414, 416 may prevent the first and second outer shims 402, 404 from acting as "donor" material to any permeable layer during attachment of the components of the seal assembly 400, and, thereby, prevent the first and second outer shims 402, 404 from substantially deforming during such an attaching process (e.g., welding). For example, in some exemplary seal assembly 400 embodiments that include at least one additional permeable layer directly adjacent one of the exemplary first and second outer shims 402, 404, and the exemplary third, fourth and fifth shims 412, 414, 416 (or any other "donor" shim) are not provided, welding the components of the seal assembly 400 together may tend to result in the first and second outer shims 402, 404 partially flowing into the at least one permeable layer and, thereby, the forming of a depression in the outer surface of the first and second outer shims 402, 404. In such embodiments, since the exterior surface of the second outer shim 404 acts as the sealing surface, as discussed above, a depression in the sealing surface may negatively impact the sealing ability or performance of the seal assembly 400.

In some alternative embodiments of seal assembly 400 (not shown), at least one of the exemplary third, fourth and fifth shims 412, 414, 416 (and any other solid shim) may not be provided. For example, an exemplary seal assembly 400 may include the exemplary third and fourth shims 412 and 414, but not the fifth shim 416. As another example, the exemplary seal assembly 400 may include the fifth shim 416 but not the exemplary third and fourth shims 412, 414. Similarly, in some alternative embodiments of seal assembly 400 (not shown) an additional shim layer or component may be provided in addition to the exemplary third, fourth and fifth shims 412, 414, 416.

The exemplary seal assembly 400 may include any number or type of filler shims or layers, and such filler shims or layers may be intermediate of the first and second outer shims 402, 404, for example. As described above and shown in FIG. 4, the exemplary illustrated seal assembly 400 includes exemplary first and second filler shims or layers 418, 420 immediately intermediate of exemplary second and third shims 412, 414 (and therefore intermediate of exemplary first and second outer shims 402, 404). In some embodiments, the exemplary filler layers may add robustness thickness to the seal assembly 400 and yet still allow (in combination with the other layers or components of the seal assembly 400) the seal assembly 400 to include adequate flexibility, stiffness, and robustness qualities, as described above, to provide low leakage rates and installation requirements.

The first and second exemplary filler shims or layers 418, 420 may be any material, shape, size and configuration. In some embodiments, the exemplary first and second filler layers 418, 420 may be more porous and/or flexible as compared to other layers or components of the seal assembly 400 (such as the exemplary first, second, third, fourth or fifth shims 402, 404, 412, 414, 416). In some embodiments, the exemplary first and second filler layers 418, 420 may provide a damping feature or capability (i.e., ability to reduce the amplitude of vibration or oscillations of at least a portion of the seal assembly 400) to the seal assembly 400. For example, the first and second filler layers 428, 420 may, in addition to the first outer shim 402, be flexible layers of metal cloth, such as a wire mesh woven structure, a ribbon mesh woven structure or combinations thereof. As another example, the first and second filler layers 418, 420 may be layers of a relatively low-stiffness material filler structure or structures, such as a honeycomb type structure or metallic foam. As yet another example, the first and second filler layers 418, 420 may be layers of any flexible "spacer" structure, such as corrugated shims, compliant shims, hollow shims and combinations thereof.

In some alternative embodiments of seal assembly 400 (not shown), additional filler layers may be provided in addition to the exemplary first and second filler layers 418, 420. In some other alternative embodiments of seal assembly 400 (not shown), only one of the first and second filler layers 418, 420 may be provided. In yet another alternative embodiment (not shown), the exemplary third, fourth and fifth shims 412, 414, 416 (and any other solid shim besides the second outer shim 404) may not be provided, and thereby the seal assembly 400 and may only include at least one of the first and second filler layers 418, 420 intermediate of the first and second outer shims 402, 404. Similarly, in some alternative embodiments the positioning of filler shim or layer, such as the first and second filler layers 418, 420, may differ from that illustrated in seal assembly 400 of FIG. 4. For example, one or more filler layers may be immediately adjacent the first and second outer shims 402, 404. Further description of such layered seal assemblies including varying configurations may be found in U.S. Publication No. 2013/0106066, entitled "Layered Seal for Turbomachinery," which is assigned to the same assignee and incorporated by reference herein.

In some alternative embodiments of the seal assembly disclosed herein (not shown), rather than including a weld or other attachment mechanism that penetrates through all of the components or layers of the seal assembly, such as the medial weld 306, 406 illustrated in FIGS. 3 and 4, the layers or components may be welded in series, and more specifically some layers or components may be coupled together, and then coupled as a group to one or more remaining layers or components. For example, in an exemplary alternative embodiment of seal assembly 400 of FIG. 4, the exemplary first and second filler layers 418, 420 and exemplary third, fourth and fifth shims 412, 414, 416 may initially be welded together by one or more relatively strong welds, and then the first and second outer shims 402, 404 may be welded thereto by one or more relatively mild welds.

In some alternative embodiments of the seal assembly disclosed herein (not shown), the shape or configuration of the exemplary first and second outer shims or layers may be configured differently than the first and second outer shims as disclosed in FIGS. 2-4. Specifically, in an exemplary alternative embodiment (not shown) of seal assembly 400 of FIG. 4, the first and second outer shims 402, 404 may include portions that extend along the thickness T3 at the sides of the seal assembly 400 towards the interior of the seal assembly 400. The exemplary first and second outer shims 402, 404 may include an exemplary first portion extending along the width W3 of the seal assembly 400 and an exemplary second portion extending along the thickness T3 of the seal assembly 400 towards the interior of the assembly 400. The first and second portions may be formed integral with the exemplary first and second outer shims. Further description of such seal assemblies including varying shapes and configurations may be found in U.S. Publication No. 2013/0106066, entitled "Layered Seal for Turbomachinery," which is assigned to the same assignee and incorporated by reference herein.

As previously described, seal assemblies 200, 300, 400 and alternative embodiments thereof, include a first outer shim 202, 302, 402 formed of a permeable material and thus permeable in nature to at least one of gases, liquids and solids at pressures produced in turbomachinery. More specifically, in the disclosed embodiments the first outer shim 202, 302, 402 is formed of a wire mesh woven structure, a ribbon mesh woven structure or combinations thereof. The disclosed seal assemblies 200, 300, 400 and alternative embodiments thereof, include a second outer shim 204, 304, 404 formed of a substantially material. More specifically, in the disclosed embodiments the second outer shim 204, 304, 404 is formed of a solid material, such as a solid metal material. In this way, the exemplary second outer shim 204, 304, 404 may sealingly engage sealing surfaces of the disclosed first and second seal slots of the first and second components to substantially prevent gases, liquids and/or solids from migrating through the gap between the first and second components, while providing inherently more flexibility than a seal including both first and second outer shims formed of a solid material due to the incorporation of the first outer seal 202, 302, 402 formed of a permeable and thus flexible material. The reduced stiffness of the seal assembly would lead to lower leakage in higher misaligned conditions because the seal would be able to conform better to the geometry of the first and second seal slots of the seal assemblies 200, 300, 400.

In addition, the seal assemblies disclosed herein (e.g., seal assemblies 200, 300, 400 and alternative embodiments thereof) provide a low leakage rate similar to that possible with an assembly including dual solid shims, and more specifically, solid first and second outer shims, such as solid metal shim seals (thin or thick) while eliminating the manufacturing, assembly, and robustness concerns when applied to turbomachinery. In addition, the seal assemblies disclosed herein may be less susceptible to manufacturing variations as compared to existing cloth seals. The seal assemblies disclosed herein provide greater flexibility to accommodate geometry differences, while reducing leakage with low manufacturing and operational risks, and are applicable in both OEM and retrofit applications.

It is to be understood that the above description is intended to be illustrative, and not restrictive. Numerous changes and modifications may be made herein by one of ordinary skill in the art without departing from the general spirit and scope of the disclosure as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35

U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. While only certain features of the embodiments have been illustrated and described herein, many modifications and changes will occur to those skilled in the art. It is, therefore, to be understood that the appended claims are intended to cover all such modifications and changes as fall within the true spirit of the disclosure.

What is claimed is:

1. A seal assembly for sealing a gap between adjacent turbomachinery components, the assembly including:
   a first outermost shim comprised of a substantially permeable material;
   a second outermost shim, operably coupled to the first outermost shim, the second outermost shim comprised of a substantially impervious material; and
   at least one of an inner shim and a filler layer positioned between the first outermost shim and the second outermost shim, and wherein the at least one of an inner shim and a filler layer are operably coupled to at least one of the first outermost shim and the second outermost shim, wherein the at least one inner shim is substantially solid,
   wherein the first outermost shim is configured in a top position and the second outermost shim is configured in a bottom position adjacent a low-pressure surface of the seal assembly, and
   wherein the first outer shim and the second outer shim are configured to span across the gap and engage each of the adjacent turbomachinery components to substantially seal the gap therebetween.

2. The seal assembly of claim 1, wherein the first outermost shim is comprised of a wire mesh woven structure.

3. The seal assembly of claim 1, wherein the first outermost shim is comprised of a ribbon mesh woven structure.

4. The seal assembly of claim 1, wherein the first outermost shim is comprised of a combined wire mesh and ribbon mesh woven structure.

5. The seal assembly of claim 1, wherein the second outermost shim is comprised of a solid material.

6. The seal assembly of claim 5, wherein the second outermost shim is comprised of a solid metal material.

7. The seal assembly of claim 1, wherein the at least one filler layer includes at least one of a wire mesh woven cloth, a flat ribbon mesh woven cloth, a honeycomb structure, a corrugated shim and a compliant shim.

8. The seal assembly of claim 1, wherein the seal assembly includes:
   a first inner shim adjacent a first filler layer and positioned between the first outermost shim and the first filler layer; and
   a second inner shim adjacent a second filler layer and positioned between the second outermost shim and the second filler layer.

9. The seal assembly of claim 8, wherein the seal assembly includes at least one inner shim positioned between at least two filler layers, and wherein the at least one inner shim is adjacent at least one of the at least two filler layers.

10. The seal assembly of claim 1, wherein the seal assembly defines a width and a thickness, wherein the first and second outermost shims extend at least along the width of the seal assembly.

11. A seal assembly for sealing between adjacent turbomachinery components, the assembly including:
    a first outermost shim comprised of a flexible material permeable to at least one of gases, liquids and solids at a pressure produced in the turbomachinery components;
    a second outermost shim comprised of a material substantially impervious to at least one of gases, liquids and solids at a pressure produced in the turbomachinery components; and
    at least one of an inner shim and a filler layer positioned between the first and second outermost shims, wherein the inner shim is substantially solid,
    wherein the first outermost shim, second outermost shim and at least one of an inner shim and a filler layer are operably coupled to one another,
    wherein the first outermost shim is configured in a top position and the second outermost shim is configured in a bottom position adjacent a low-pressure surface of the seal assembly, and
    wherein at least the second outermost shim is configured to span across a gap and engage each of the adjacent turbomachinery components to substantially seal the gap therebetween.

12. The seal assembly of claim 11, wherein the first outermost shim is comprised of at least one of a wire mesh woven structure, a ribbon mesh woven structure, or a combination of a wire mesh and a ribbon mesh woven structure.

13. The seal assembly of claim 11, wherein the second outermost shim is comprised of a solid material.

14. The seal assembly of claim 11, wherein the second outermost shim comprises a sealing surface facing the gap between a first seal slot positioned within a first turbinemachinery component and a second seal slot positioned within a second turbinemarchinery component.

15. A turbomachine, comprising:
a first stator;
a second stator; and
a seal assembly positioned between the first stator and the second stator, the seal assembly comprising:
- a first outermost shim comprised of a flexible material permeable to a flow of fluid at a pressure produced in the first stator and the second stator;
- a second outermost shim, operably coupled to the first outer shim and comprised of a material substantially impervious to the flow of fluid at a pressure produced in the first stator and the second stator; and
- at least one of an inner shim and a filler layer positioned between the first outermost shim and the second outermost shim, and wherein the at least one of an inner shim and a filler layer are operably coupled to at least one of the first outermost shim and the second outermost shim, wherein the at least one inner shim is substantially solid,
- wherein the first outermost shim is configured in a top position and the second outermost shim is configured in a bottom position adjacent a low-pressure surface of the seal assembly, and
- wherein the first outermost shim and the second outermost shim are configured to span across a gap between the first stator and the second stator and engage each of the first suitor and the second stator to substantially seal the gap therebetween.

16. The turbomachine of claim 15, wherein the first outermost shim is comprised of at least one of a wire mesh woven structure, a ribbon mesh woven structure, or a combination of a wire mesh woven structure and a ribbon mesh woven structure.

17. The turbomachine of claim 16, wherein the second outermost shim is comprised of a solid material.

* * * * *